US012141907B2

(12) United States Patent
Cross et al.

(10) Patent No.: US 12,141,907 B2
(45) Date of Patent: Nov. 12, 2024

(54) VIRTUAL SEPARATE SPACES FOR VIRTUAL REALITY EXPERIENCES

(71) Applicant: Meta Platforms Technologies, LLC, Menlo Park, CA (US)

(72) Inventors: Rachel Cross, Foster City, CA (US); Harini Chandrasekar, Seattle, WA (US); Patricia Dooley, Bothell, WA (US); Sharon Kojima, San Jose, CA (US)

(73) Assignee: Meta Platforms Technologies, LLC, Menlo Park, CA (US)

( * ) Notice: Subject to any disclaimer, the term of this patent is extended or adjusted under 35 U.S.C. 154(b) by 131 days.

(21) Appl. No.: 17/822,985

(22) Filed: Aug. 29, 2022

(65) Prior Publication Data

US 2024/0070957 A1 Feb. 29, 2024

(51) Int. Cl.
*G06T 19/00* (2011.01)
*G06T 15/00* (2011.01)
*H04L 9/40* (2022.01)
(52) U.S. Cl.
CPC ............ *G06T 15/00* (2013.01); *H04L 63/102* (2013.01)

(58) Field of Classification Search
CPC ...... G06F 3/011; G06F 3/04815; G06F 3/012; G06F 3/017; G06F 3/0484; G06T 19/006; G06T 13/40
See application file for complete search history.

(56) References Cited

U.S. PATENT DOCUMENTS

| 2021/0312684 | A1* | 10/2021 | Zimmermann | ........ G02B 27/01 |
| 2022/0124125 | A1* | 4/2022 | Punwani | ............. H04L 65/1093 |
| 2022/0155850 | A1* | 5/2022 | Kodeih | ................... G06F 3/011 |

* cited by examiner

*Primary Examiner* — Hau H Nguyen
(74) *Attorney, Agent, or Firm* — Potomac Law Group, PLLC; Dannon G. Allbee

(57) ABSTRACT

Implementations can provide a virtual separate space with respect to a virtual venue hosting a virtual reality (VR) experience, such as a concert, a sports game, a meeting, etc., e.g., to replicate the feeling of a side conversation to discuss the VR experience. Some implementations can create a more intimate experience for users viewing a VR experience by providing a quiet, curated space that can be customized, e.g., by changing the look of users' avatars and their virtual environment, without their interactions being observed by others viewing the VR experience at the virtual venue. The virtual separate space can include a moderated version of the VR experience, such as a smaller version of the VR experience with the sounds of the VR experience muffled. Thus, users within the virtual separate space can step away from the VR experience to enter a more controlled environment, while still enjoying the VR experience.

20 Claims, 10 Drawing Sheets

VIRTUAL SEPARATE SPACES FOR VIRTUAL REALITY EXPERIENCES

TECHNICAL FIELD

The present disclosure is directed to providing a virtual separate space with respect to a virtual venue hosting a virtual reality (VR) experience.

BACKGROUND

Artificial reality (XR) devices are becoming more prevalent. As they become more popular, the applications implemented on such devices are becoming more sophisticated. Virtual reality (VR) applications can provide an entirely self-contained three-dimensional (3D) computer environment in which a user's view is fully controlled by the computer. VR experiences, such as concerts, meetings, sporting events, games, etc., can be observed by a user through a fully immersive head-mounted display (HMD) (e.g., a headset), or on a two-dimensional (2D) interface, such as a screen on a mobile device or a web browser on a computer.

BRIEF DESCRIPTION OF THE DRAWINGS

The techniques introduced here may be better understood by referring to the following Detailed Description in conjunction with the accompanying drawings, in which like reference numerals indicate identical or functionally similar elements.

DETAILED DESCRIPTION

Figure 1:
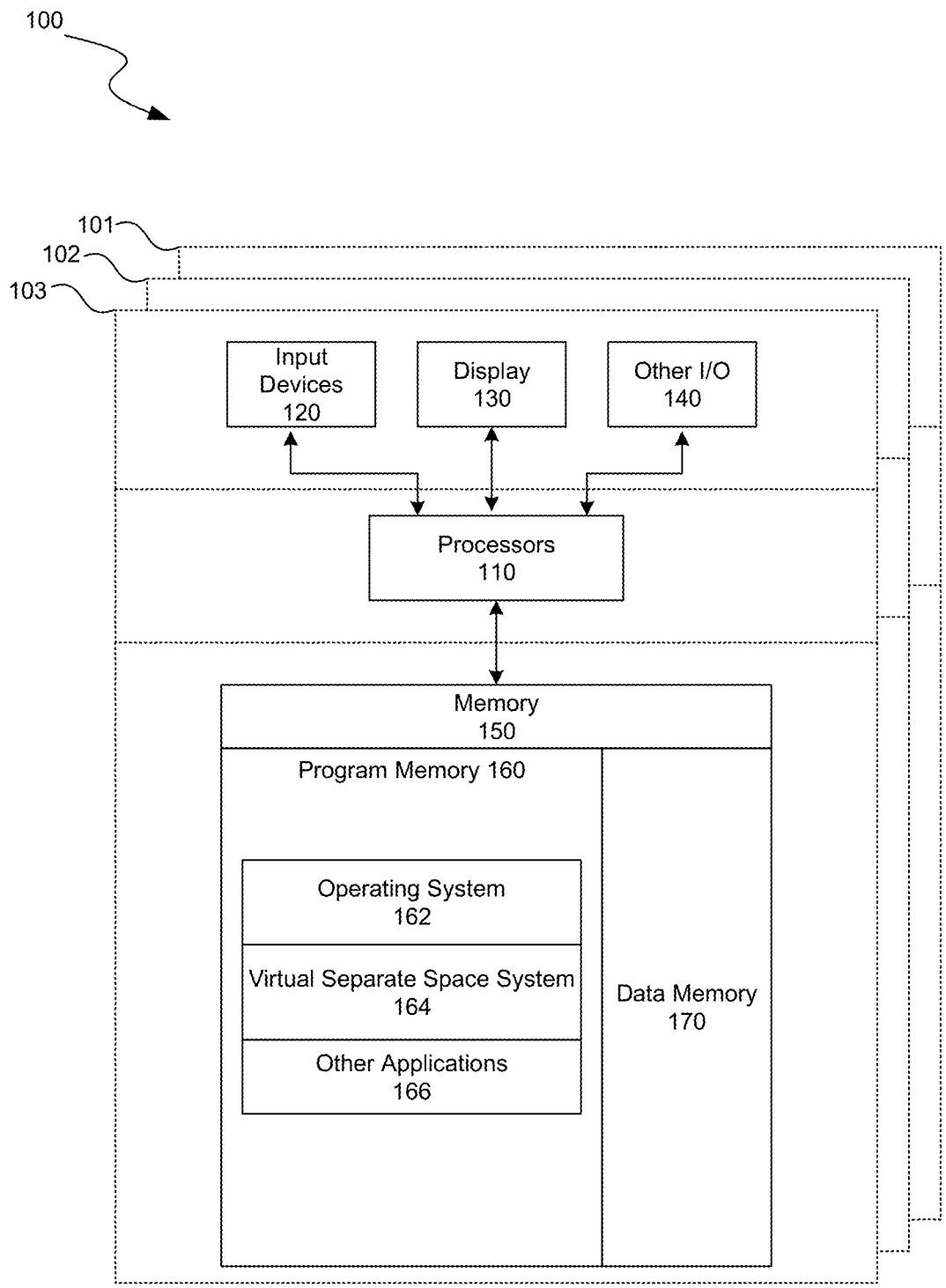
FIG. 1 is a block diagram illustrating an overview of devices on which some implementations of the present technology can operate.

Aspects of the present disclosure are directed to providing a virtual separate space with respect to a virtual venue hosting a virtual reality (VR) experience. Implementations can provide a virtual separate space with respect to a virtual venue hosting a VR experience, such as a concert, a sports game, a meeting, etc., to replicate the feeling of a quick conversation around a snack station or water cooler to discuss the VR experience. For example, some implementations can create a more intimate experience for users viewing a VR experience by providing a quiet, curated space that can be customized, e.g., by changing the look of users' avatars and/or their virtual environment, without their interactions and conversations being observed by others viewing the VR experience outside of the virtual separate space. The virtual separate space can include a moderated version of the VR experience, such as by placing the VR experience in the background of the virtual separate space, by muffling the sounds of the VR experience, etc. Thus, users within the virtual separate space can step away from the VR experience while still viewing a moderated version of the VR experience, an even enter a new VR experience.

For example, a group of friends can view a soccer game on VR headsets while inside a virtual arena. One of the friends can create a separate space and invite the other friends to join him in the separate space. The friend can customize the separate space, such as by selecting and decorating a virtual living room. The friends can also customize their avatars for the virtual living room, such as by changing into pajamas. The soccer game can be shown on a virtual television within the virtual living room with muffled sound, such that the friends can have conversations over the soccer game that are private to the friends within the virtual living room. The avatars of the friends can be shown in an altered form in the virtual arena (e.g., with slight transparency) to indicate that they are watching the soccer game from a separate space.

In another example, a group of users can view a cooking competition on a combination of VR headsets and two-dimensional (2D) interfaces while inside a virtual theater. A professional chef can create a separate space, e.g., a virtual classroom overlooking the virtual stage of the virtual theater. For a small fee, users can enter the virtual classroom and view the cooking competition, while also learning about cooking techniques and hearing feedback about the cooking competition from the professional chef.

As used herein, an "artificial reality (XR) device" can include any XR interface or two-dimensional (2D) interface capable of rendering an XR experience. For example, an "XR interface" can be a device capable of displaying a fully immersive XR experience, such as a head-mounted display within an XR system, e.g., a VR headset or augmented reality (AR) headset. In some implementations, the XR system can include devices and components other than the XR interface to support the XR experience, such as processing components, input/output devices (e.g., controllers), etc. A "2D interface" can be an application or device that can render an XR environment on a 2D surface. For example, a 2D interface can be a computer screen, television display, mobile device (e.g., cellular phone), mobile application, web browser, etc. The 2D interface can be part of a 2D system including other devices and components, such as processing components, input/output devices, etc.

Embodiments of the disclosed technology may include or be implemented in conjunction with an artificial reality system. Artificial reality or extra reality (XR) is a form of reality that has been adjusted in some manner before presentation to a user, which may include, e.g., virtual reality (VR), augmented reality (AR), mixed reality (MR), hybrid reality, or some combination and/or derivatives thereof.

Artificial reality content may include completely generated content or generated content combined with captured content (e.g., real-world photographs). The artificial reality content may include video, audio, haptic feedback, or some combination thereof, any of which may be presented in a single channel or in multiple channels (such as stereo video that produces a three-dimensional effect to the viewer). Additionally, in some embodiments, artificial reality may be associated with applications, products, accessories, services, or some combination thereof, that are, e.g., used to create content in an artificial reality and/or used in (e.g., perform activities in) an artificial reality. The artificial reality system that provides the artificial reality content may be implemented on various platforms, including a head-mounted display (HMD) connected to a host computer system, a standalone HMD, a mobile device or computing system, a "cave" environment or other projection system, or any other hardware platform capable of providing artificial reality content to one or more viewers.

"Virtual reality" or "VR," as used herein, refers to an immersive experience where a user's visual input is controlled by a computing system. "Augmented reality" or "AR" refers to systems where a user views images of the real world after they have passed through a computing system. For example, a tablet with a camera on the back can capture images of the real world and then display the images on the screen on the opposite side of the tablet from the camera. The tablet can process and adjust or "augment" the images as they pass through the system, such as by adding virtual objects. "Mixed reality" or "MR" refers to systems where light entering a user's eye is partially generated by a computing system and partially composes light reflected off objects in the real world. For example, a MR headset could be shaped as a pair of glasses with a pass-through display, which allows light from the real world to pass through a waveguide that simultaneously emits light from a projector in the MR headset, allowing the MR headset to present virtual objects intermixed with the real objects the user can see. "Artificial reality," "extra reality," or "XR," as used herein, refers to any of VR, AR, MR, or any combination or hybrid thereof.

Implementations can improve on existing VR applications and technologies by providing a more realistic user experience. For example, implementations can give users the ability to multitask while enjoying a VR experience, e.g., by viewing a virtual sporting event while getting their avatars' hair styled at a virtual beauty salon, instead of requiring the users' full attention on a single VR experience. Further, implementations can allow users to privately have side conversations with other users (e.g., friends) that can be relevant to a VR experience, and augment the VR experience with additional information, opinions, and more private social interactions. In addition, some implementations can allow experts in a particular area to provide commentary on a VR experience, allowing for a more content-rich, educational, interactive, and unique user experience. Further, by allowing users to move into separate spaces, a large VR experience can be segmented so that different servers can provide the experiences to different groups of users (e.g., those in the main experience and those in the separate space), thereby reducing server load on individual machines and distributing server resources—improving server availability.

Several implementations are discussed below in more detail in reference to the figures. FIG. 1 is a block diagram illustrating an overview of devices on which some implementations of the disclosed technology can operate. The devices can comprise hardware components of a computing system 100 that can provide a virtual separate space with respect to a virtual venue hosting a virtual reality (VR) experience. In various implementations, computing system 100 can include a single computing device 103 or multiple computing devices (e.g., computing device 101, computing device 102, and computing device 103) that communicate over wired or wireless channels to distribute processing and share input data. In some implementations, computing system 100 can include a stand-alone headset capable of providing a computer created or augmented experience for a user without the need for external processing or sensors. In other implementations, computing system 100 can include multiple computing devices such as a headset and a core processing component (such as a console, mobile device, or server system) where some processing operations are performed on the headset and others are offloaded to the core processing component. Example headsets are described below in relation to FIGS. 2A and 2B. In some implementations, position and environment data can be gathered only by sensors incorporated in the headset device, while in other implementations one or more of the non-headset computing devices can include sensor components that can track environment or position data.

Computing system 100 can include one or more processor(s) 110 (e.g., central processing units (CPUs), graphical processing units (GPUs), holographic processing units (HPUs), etc.) Processors 110 can be a single processing unit or multiple processing units in a device or distributed across multiple devices (e.g., distributed across two or more of computing devices 101-103).

Computing system 100 can include one or more input devices 120 that provide input to the processors 110, notifying them of actions. The actions can be mediated by a hardware controller that interprets the signals received from the input device and communicates the information to the processors 110 using a communication protocol. Each input device 120 can include, for example, a mouse, a keyboard, a touchscreen, a touchpad, a wearable input device (e.g., a haptics glove, a bracelet, a ring, an earring, a necklace, a watch, etc.), a camera (or other light-based input device, e.g., an infrared sensor), a microphone, or other user input devices.

Processors 110 can be coupled to other hardware devices, for example, with the use of an internal or external bus, such as a PCI bus, SCSI bus, or wireless connection. The processors 110 can communicate with a hardware controller for devices, such as for a display 130. Display 130 can be used to display text and graphics. In some implementations, display 130 includes the input device as part of the display, such as when the input device is a touchscreen or is equipped with an eye direction monitoring system. In some implementations, the display is separate from the input device. Examples of display devices are: an LCD display screen, an LED display screen, a projected, holographic, or augmented reality display (such as a heads-up display device or a head-mounted device), and so on. Other I/O devices 140 can also be coupled to the processor, such as a network chip or card, video chip or card, audio chip or card, USB, firewire or other external device, camera, printer, speakers, CD-ROM drive, DVD drive, disk drive, etc.

In some implementations, input from the I/O devices 140, such as cameras, depth sensors, IMU sensor, GPS units, LiDAR or other time-of-flights sensors, etc. can be used by the computing system 100 to identify and map the physical environment of the user while tracking the user's location within that environment. This simultaneous localization and mapping (SLAM) system can generate maps (e.g., topologies, girds, etc.) for an area (which may be a room, building, outdoor space, etc.) and/or obtain maps previously generated by computing system 100 or another computing system that had mapped the area. The SLAM system can track the user within the area based on factors such as GPS data, matching identified objects and structures to mapped objects and structures, monitoring acceleration and other position changes, etc.

Computing system 100 can include a communication device capable of communicating wirelessly or wire-based with other local computing devices or a network node. The communication device can communicate with another device or a server through a network using, for example, TCP/IP protocols. Computing system 100 can utilize the communication device to distribute operations across multiple network devices.

The processors 110 can have access to a memory 150, which can be contained on one of the computing devices of computing system 100 or can be distributed across of the multiple computing devices of computing system 100 or other external devices. A memory includes one or more hardware devices for volatile or non-volatile storage, and can include both read-only and writable memory. For example, a memory can include one or more of random access memory (RAM), various caches, CPU registers, read-only memory (ROM), and writable non-volatile memory, such as flash memory, hard drives, floppy disks, CDs, DVDs, magnetic storage devices, tape drives, and so forth. A memory is not a propagating signal divorced from underlying hardware; a memory is thus non-transitory. Memory 150 can include program memory 160 that stores programs and software, such as an operating system 162, virtual separate space system 164, and other application programs 166. Memory 150 can also include data memory 170 that can include, e.g., virtual reality experience data, virtual venue data, virtual separate space data, avatar data, rendering data, configuration data, settings, user options or preferences, etc., which can be provided to the program memory 160 or any element of the computing system 100.

Some implementations can be operational with numerous other computing system environments or configurations. Examples of computing systems, environments, and/or configurations that may be suitable for use with the technology include, but are not limited to, XR headsets, personal computers, server computers, handheld or laptop devices, cellular telephones, wearable electronics, gaming consoles, tablet devices, multiprocessor systems, microprocessor-based systems, set-top boxes, programmable consumer electronics, network PCs, minicomputers, mainframe computers, distributed computing environments that include any of the above systems or devices, or the like.

Figure 2A:
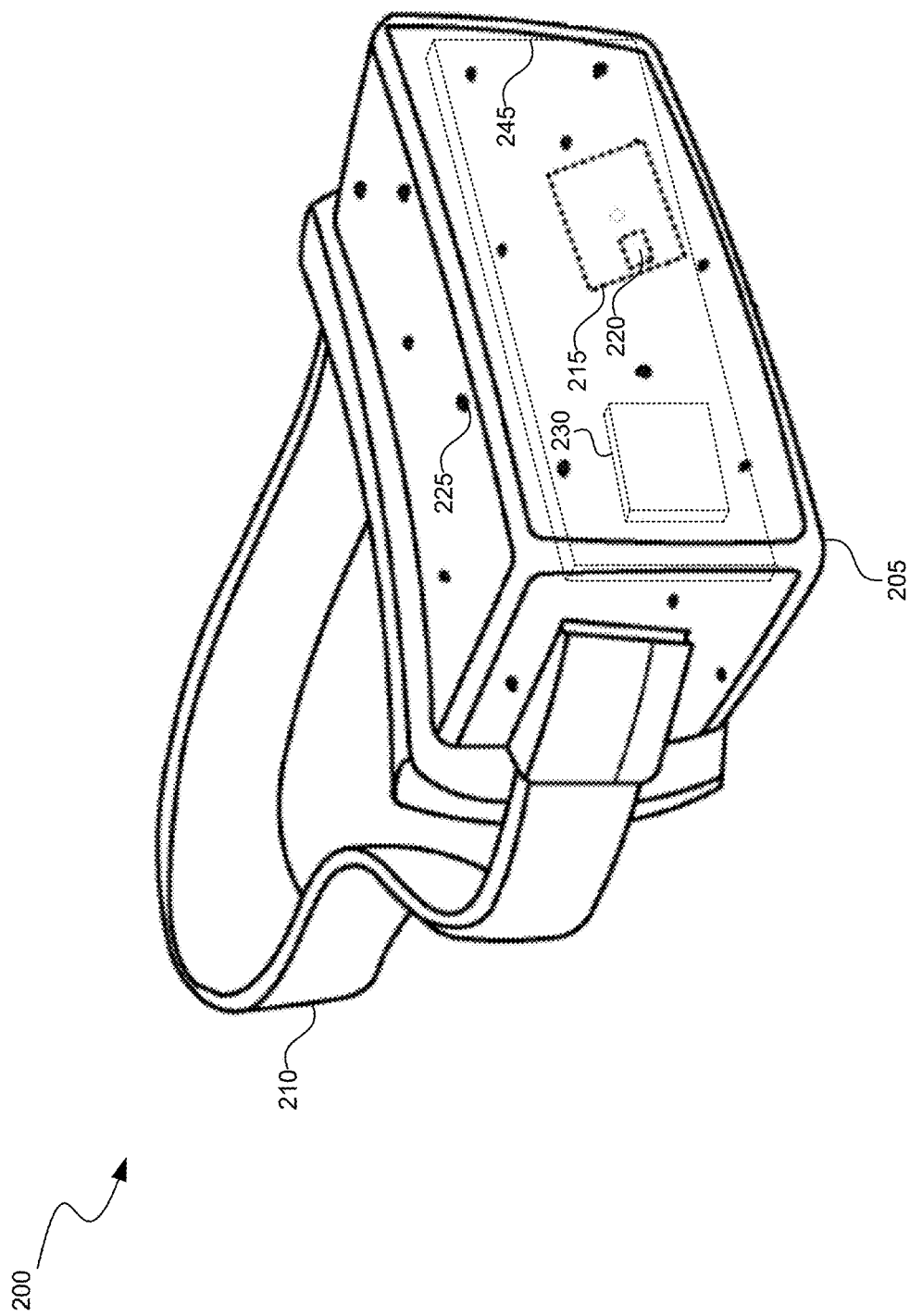
FIG. 2A is a wire diagram illustrating a virtual reality headset which can be used in some implementations of the present technology.

FIG. 2A is a wire diagram of a virtual reality head-mounted display (HMD) 200, in accordance with some embodiments. The HMD 200 includes a front rigid body 205 and a band 210. The front rigid body 205 includes one or more electronic display elements of an electronic display 245, an inertial motion unit (IMU) 215, one or more position sensors 220, locators 225, and one or more compute units 230. The position sensors 220, the IMU 215, and compute units 230 may be internal to the HMD 200 and may not be visible to the user. In various implementations, the IMU 215, position sensors 220, and locators 225 can track movement and location of the HMD 200 in the real world and in an artificial reality environment in three degrees of freedom (3DoF) or six degrees of freedom (6DoF). For example, the locators 225 can emit infrared light beams which create light points on real objects around the HMD 200. As another example, the IMU 215 can include e.g., one or more accelerometers, gyroscopes, magnetometers, other non-camera-based position, force, or orientation sensors, or combinations thereof. One or more cameras (not shown) integrated with the HMD 200 can detect the light points. Compute units 230 in the HMD 200 can use the detected light points to extrapolate position and movement of the HMD 200 as well as to identify the shape and position of the real objects surrounding the HMD 200.

The electronic display 245 can be integrated with the front rigid body 205 and can provide image light to a user as dictated by the compute units 230. In various embodiments, the electronic display 245 can be a single electronic display or multiple electronic displays (e.g., a display for each user eye). Examples of the electronic display 245 include: a liquid crystal display (LCD), an organic light-emitting diode (OLED) display, an active-matrix organic light-emitting diode display (AMOLED), a display including one or more quantum dot light-emitting diode (QOLED) sub-pixels, a projector unit (e.g., microLED, LASER, etc.), some other display, or some combination thereof.

In some implementations, the HMD 200 can be coupled to a core processing component such as a personal computer (PC) (not shown) and/or one or more external sensors (not shown). The external sensors can monitor the HMD 200 (e.g., via light emitted from the HMD 200) which the PC can use, in combination with output from the IMU 215 and position sensors 220, to determine the location and movement of the HMD 200.

Figure 2B:
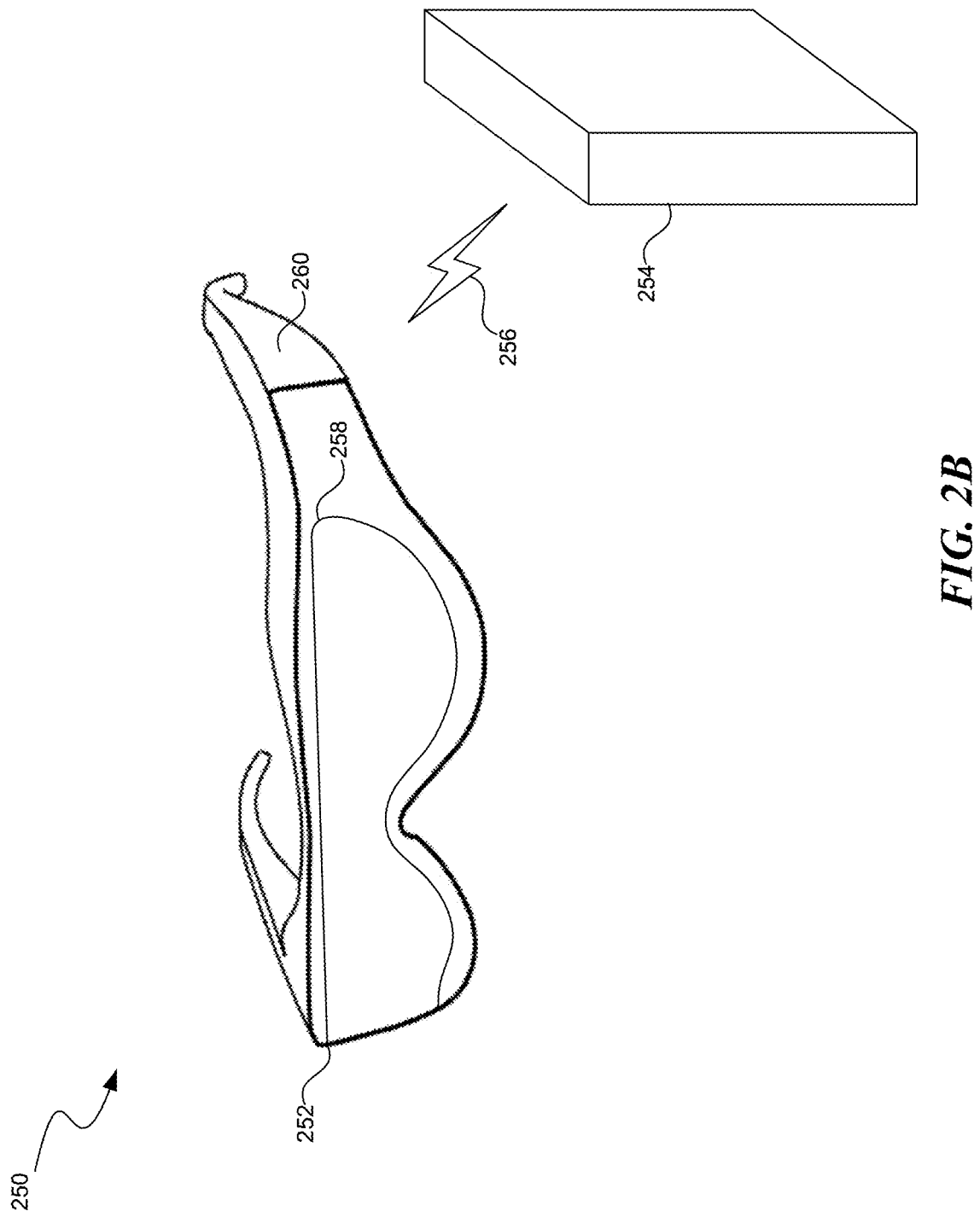
FIG. 2B is a wire diagram illustrating a mixed reality headset which can be used in some implementations of the present technology.

FIG. 2B is a wire diagram of a mixed reality HMD system 250 which includes a mixed reality HMD 252 and a core processing component 254. The mixed reality HMD 252 and the core processing component 254 can communicate via a wireless connection (e.g., a 60 GHz link) as indicated by link 256. In other implementations, the mixed reality system 250 includes a headset only, without an external compute device or includes other wired or wireless connections between the mixed reality HMD 252 and the core processing component 254. The mixed reality HMD 252 includes a pass-through display 258 and a frame 260. The frame 260 can house various electronic components (not shown) such as light projectors (e.g., LASERs, LEDs, etc.), cameras, eye-tracking sensors, MEMS components, networking components, etc.

The projectors can be coupled to the pass-through display 258, e.g., via optical elements, to display media to a user. The optical elements can include one or more waveguide assemblies, reflectors, lenses, mirrors, collimators, gratings, etc., for directing light from the projectors to a user's eye. Image data can be transmitted from the core processing component 254 via link 256 to HMD 252. Controllers in the HMD 252 can convert the image data into light pulses from the projectors, which can be transmitted via the optical elements as output light to the user's eye. The output light can mix with light that passes through the display 258, allowing the output light to present virtual objects that appear as if they exist in the real world.

Similarly to the HMD 200, the HMD system 250 can also include motion and position tracking units, cameras, light sources, etc., which allow the HMD system 250 to, e.g., track itself in 3DoF or 6DoF, track portions of the user (e.g., hands, feet, head, or other body parts), map virtual objects to appear as stationary as the HMD 252 moves, and have virtual objects react to gestures and other real-world objects.

Figure 2C:
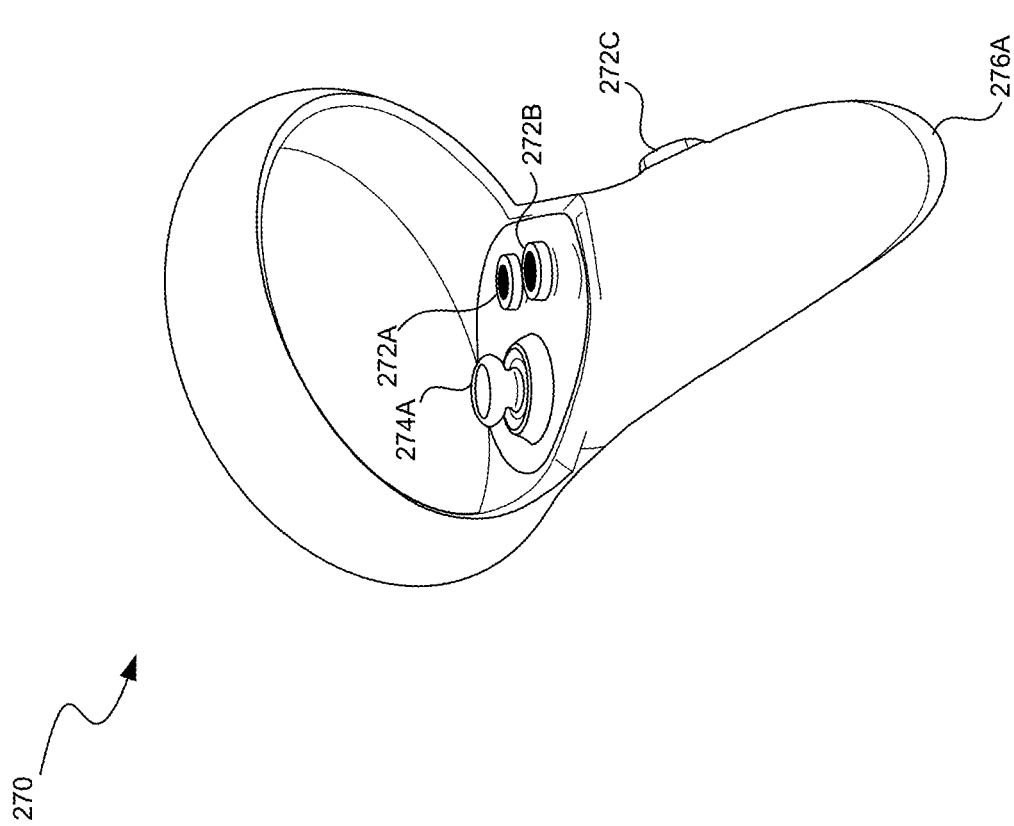
FIG. 2C is a wire diagram illustrating controllers which, in some implementations, a user can hold in one or both hands to interact with an artificial reality environment.

FIG. 2C illustrates controllers 270 (including controller 276A and 276B), which, in some implementations, a user can hold in one or both hands to interact with an artificial reality environment presented by the HMD 200 and/or HMD 250. The controllers 270 can be in communication with the HMDs, either directly or via an external device (e.g., core processing component 254). The controllers can have their own IMU units, position sensors, and/or can emit further light points. The HMD 200 or 250, external sensors, or sensors in the controllers can track these controller light points to determine the controller positions and/or orientations (e.g., to track the controllers in 3DoF or 6DoF). The compute units 230 in the HMD 200 or the core processing component 254 can use this tracking, in combination with IMU and position output, to monitor hand positions and motions of the user. The controllers can also include various buttons (e.g., buttons 272A-F) and/or joysticks (e.g., joysticks 274A-B), which a user can actuate to provide input and interact with objects.

In various implementations, the HMD 200 or 250 can also include additional subsystems, such as an eye tracking unit, an audio system, various network components, etc., to monitor indications of user interactions and intentions. For example, in some implementations, instead of or in addition to controllers, one or more cameras included in the HMD 200 or 250, or from external cameras, can monitor the positions and poses of the user's hands to determine gestures and other hand and body motions. As another example, one or more light sources can illuminate either or both of the user's eyes and the HMD 200 or 250 can use eye-facing cameras to capture a reflection of this light to determine eye position (e.g., based on set of reflections around the user's cornea), modeling the user's eye and determining a gaze direction.

Figure 3:
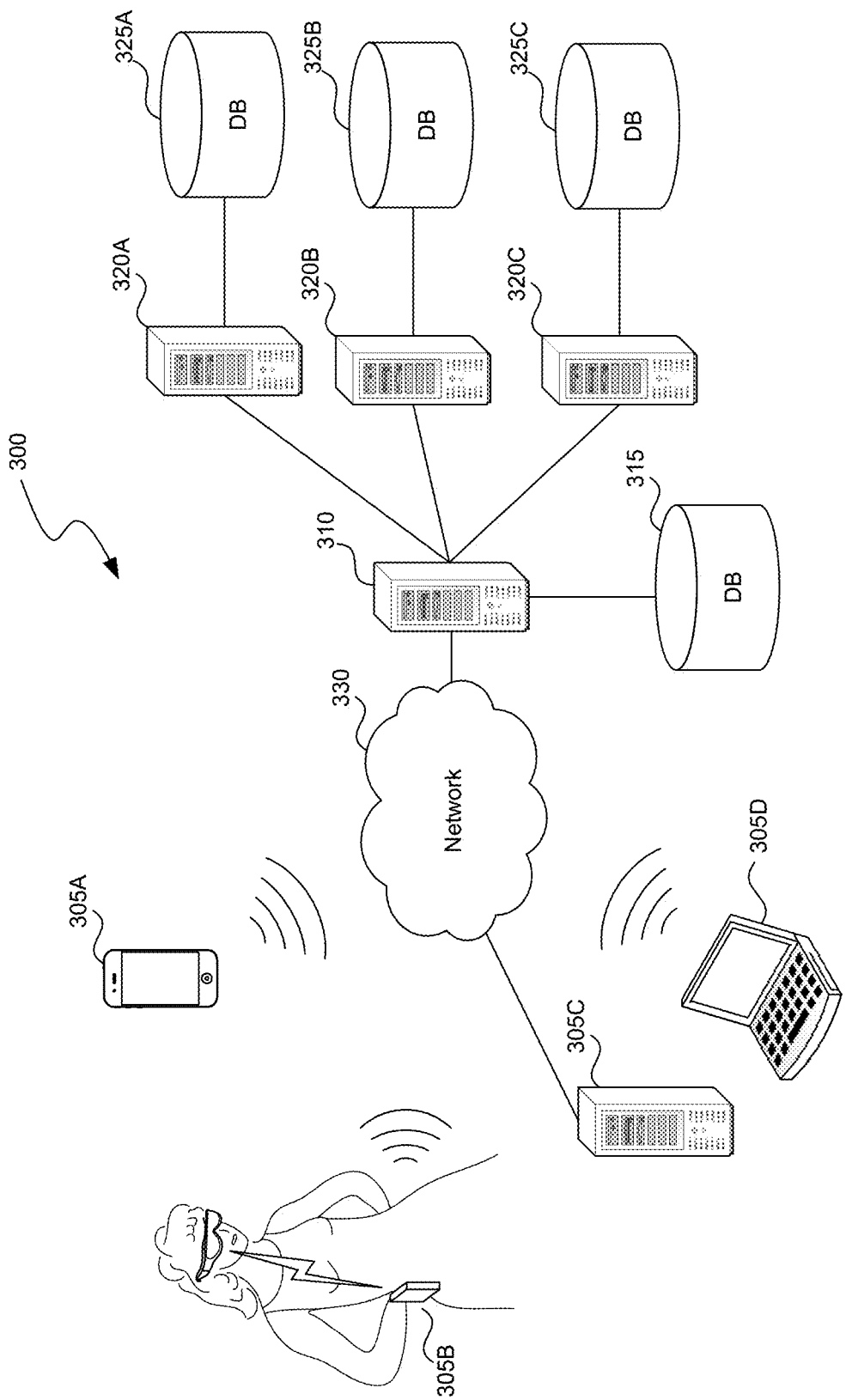
FIG. 3 is a block diagram illustrating an overview of an environment in which some implementations of the present technology can operate.

FIG. 3 is a block diagram illustrating an overview of an environment 300 in which some implementations of the disclosed technology can operate. Environment 300 can include one or more client computing devices 305A-D, examples of which can include computing system 100. In some implementations, some of the client computing devices (e.g., client computing device 305B) can be the HMD 200 or the HMD system 250. Client computing devices 305 can operate in a networked environment using logical connections through network 330 to one or more remote computers, such as a server computing device.

In some implementations, server 310 can be an edge server which receives client requests and coordinates fulfillment of those requests through other servers, such as servers 320A-C. Server computing devices 310 and 320 can comprise computing systems, such as computing system 100. Though each server computing device 310 and 320 is displayed logically as a single server, server computing devices can each be a distributed computing environment encompassing multiple computing devices located at the same or at geographically disparate physical locations.

Client computing devices 305 and server computing devices 310 and 320 can each act as a server or client to other server/client device(s). Server 310 can connect to a database 315. Servers 320A-C can each connect to a corresponding database 325A-C. As discussed above, each server 310 or 320 can correspond to a group of servers, and each of these servers can share a database or can have their own database. Though databases 315 and 325 are displayed logically as single units, databases 315 and 325 can each be a distributed computing environment encompassing multiple computing devices, can be located within their corresponding server, or can be located at the same or at geographically disparate physical locations.

Network 330 can be a local area network (LAN), a wide area network (WAN), a mesh network, a hybrid network, or other wired or wireless networks. Network 330 may be the Internet or some other public or private network. Client computing devices 305 can be connected to network 330 through a network interface, such as by wired or wireless communication. While the connections between server 310 and servers 320 are shown as separate connections, these connections can be any kind of local, wide area, wired, or wireless network, including network 330 or a separate public or private network.

Figure 4:
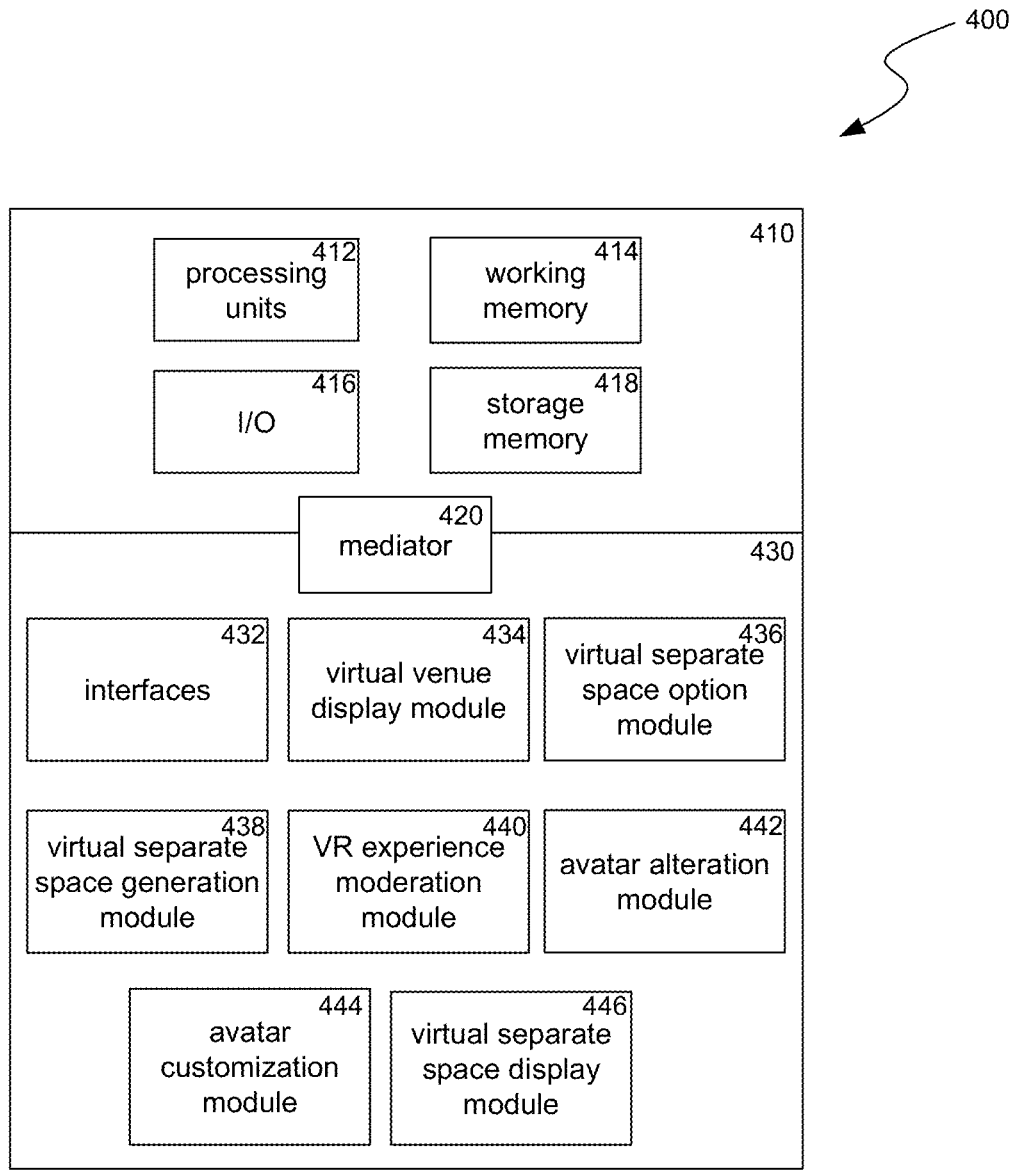
FIG. 4 is a block diagram illustrating components which, in some implementations, can be used in a system employing the disclosed technology.

FIG. 4 is a block diagram illustrating components 400 which, in some implementations, can be used in a system employing the disclosed technology. Components 400 can be included in one device of computing system 100 or can be distributed across multiple of the devices of computing system 100. The components 400 include hardware 410, mediator 420, and specialized components 430. As discussed above, a system implementing the disclosed technology can use various hardware including processing units 412, working memory 414, input and output devices 416 (e.g., cameras, displays, IMU units, network connections, etc.), and storage memory 418. In various implementations, storage memory 418 can be one or more of: local devices, interfaces to remote storage devices, or combinations thereof. For example, storage memory 418 can be one or more hard drives or flash drives accessible through a system bus or can be a cloud storage provider (such as in storage 315 or 325) or other network storage accessible via one or more communications networks. In various implementations, components 400 can be implemented in a client computing device such as client computing devices 305 or on a server computing device, such as server computing device 310 or 320.

Mediator 420 can include components which mediate resources between hardware 410 and specialized components 430. For example, mediator 420 can include an operating system, services, drivers, a basic input output system (BIOS), controller circuits, or other hardware or software systems.

Specialized components 430 can include software or hardware configured to perform operations for providing a virtual separate space with respect to a virtual venue hosting a virtual reality (VR) experience. Specialized components 430 can include virtual venue display module 434, virtual separate space option module 436, virtual separate space generation module 438, VR experience moderation module 440, avatar alteration module 442, avatar customization module 444, virtual separate space display module 446, and components and APIs which can be used for providing user interfaces, transferring data, and controlling the specialized components, such as interfaces 432. In some implementations, components 400 can be in a computing system that is distributed across multiple computing devices or can be an interface to a server-based application executing one or more of specialized components 430. Although depicted as separate components, specialized components 430 may be logical or other nonphysical differentiations of functions and/or may be submodules or code-blocks of one or more applications. In some implementations, one or more of specialized components 430 can be omitted.

Virtual venue display module 434 can facilitate display of a first VR experience in a virtual venue to a user on an artificial reality (XR) device. The XR device can be any XR interface or two-dimensional (2D) interface capable of rendering an XR experience, as described further herein. The virtual venue can include an avatar of the user of the XR device, indicating that the user is viewing the first VR experience from the virtual venue. In some implementations, virtual venue display module 434 can facilitate display of the first VR experience by applying and/or controlling lighting effects applied to the XR device to render the first VR experience. In some implementations, virtual venue display module 434 can facilitate display of the first VR experience by generating, transmitting, and/or interpreting rendering data used to create the first VR experience. Further details regarding facilitating display of a first VR experience in a virtual venue are described herein with respect to block 502 of FIG. 5.

Virtual separate space option module 436 can generate an option to create a virtual separate space. In some implementations, virtual separate space option module 436 can generate and display the option to create the virtual separate space throughout the time in which the first VR experience is displayed. In some implementations, virtual separate space option module 436 can generate and display the option to create the virtual separate space at a particular point in time in which the first VR experience is displayed and can, for example, prompt or suggest to a user to create the virtual separate space. Further details regarding generating an option to create a virtual separate space are described herein with respect to block 504 of FIG. 5.

Virtual separate space generation module 438 can receive a selection of the option to create the virtual separate space. For example, a user can select to create the virtual separate space from a virtual menu being displayed in conjunction with the first VR experience, or opened within the first VR experience. In another example, a user can accept to create the virtual separate space from a prompt suggesting that the user creates the virtual separate space. Further details regarding receiving selection of the option to create the virtual separate space are described herein with respect to block 506 of FIG. 5.

Virtual separate space generation module 438 can further generate the virtual separate space. The virtual separate space can have access rights separate from the virtual venue. For example, in some implementations, the virtual venue can allow any user to join the first VR experience being hosted there, while virtual separate space generation module 438 can limit access to the virtual separate space. In some implementations, the virtual separate space can be outside of the virtual venue, e.g., a virtual nail salon showing the first VR experience on a virtual television. In some implementations, the virtual separate space can be inside the virtual venue, e.g., a virtual breakroom inside a virtual office.

In some implementations, virtual separate space generation module 438 can further receive customization data specifying details of the desired virtual separate space. The customization data can include, for example, a type of virtual separate space (e.g., a virtual living room, a virtual restaurant, a virtual vehicle, a virtual park, etc.), who can join the virtual separate space (e.g., how many users, what types of users, friends, etc.), virtual objects to include in the virtual separate space (e.g., virtual popcorn, a virtual television, virtual couches, virtual tables, virtual decorative items, etc.), and the like. Further details regarding generating the virtual separate space are described herein with respect to block 506 of FIG. 5.

VR experience moderation module 440 can generate a moderated version of the first VR experience being hosted at the virtual venue. The moderated version of the first VR experience can be different than the first VR experience as seen at the virtual venue in any of a number of aspects. For example, the moderated version of the first VR experience can have lower volume, be smaller in size, shown through a window or door of the virtual separate space, shown on a virtual television of the virtual separate space, shown darker in color, shown partially transparent, etc. Further details regarding generating a moderated version of the first VR experience are described herein with respect to block 508 of FIG. 5.

Avatar alteration module 442 can generate an altered representation of the avatar of the user of the XR device. The altered representation of the avatar of the user can be different than the avatar originally included at the virtual venue in any of a number of aspects. For example, the altered representation of the avatar can be an avatar with headphones on, a faded avatar, a slightly transparent avatar, an avatar surrounded by a virtual bubble, etc. Further details regarding generating an altered representation of the avatar of the user of the XR device are described herein with respect to block 508 of FIG. 5.

Avatar customization module 444 can allow the user of the XR device to customize his or her avatar for the virtual separate space. For example, for a virtual separate space of a virtual living room in which a virtual sporting event is being viewed, the user can customize his avatar to be wearing virtual pajamas. In another example, for a virtual separate space of a spa in which a virtual symphony orchestra performance is being viewed, the user can customize her avatar to be wearing a virtual robe. Further details regarding customization of a user's avatar for a virtual separate space are described herein with respect to block 510 of FIG. 5.

Virtual separate space display module 446 can facilitate display of a second VR experience at the virtual separate space. In some implementations, virtual separate space display module 446 can facilitate display of the second VR experience by applying and/or controlling lighting effects applied to the XR device to render the second VR experience. In some implementations, virtual separate space display module 446 can facilitate display of the second VR experience by generating, transmitting, and/or interpreting rendering data used to create the second VR experience.

The second VR experience can be any VR experience different than the first VR experience, regardless of whether the second VR experience is collocated with or outside of the virtual venue. In some implementations, the virtual separate space can include the moderated version of the first VR experience and the avatar of the user of the XR device. For example, the second VR experience can be a virtual barber shop where the avatar of the user is getting his hair cut (i.e., a second VR experience) while watching a sporting event on a virtual television at the virtual barber shop (i.e., a moderated version of the first VR experience). Further details regarding facilitating display of the second VR experience at the virtual separate space are described herein with respect to block 510 of FIG. 5.

Those skilled in the art will appreciate that the components illustrated in FIGS. 1-4 described above, and in each of the flow diagrams discussed below, may be altered in a variety of ways. For example, the order of the logic may be rearranged, substeps may be performed in parallel, illustrated logic may be omitted, other logic may be included, etc. In some implementations, one or more of the components described above can execute one or more of the processes described below.

Figure 5:
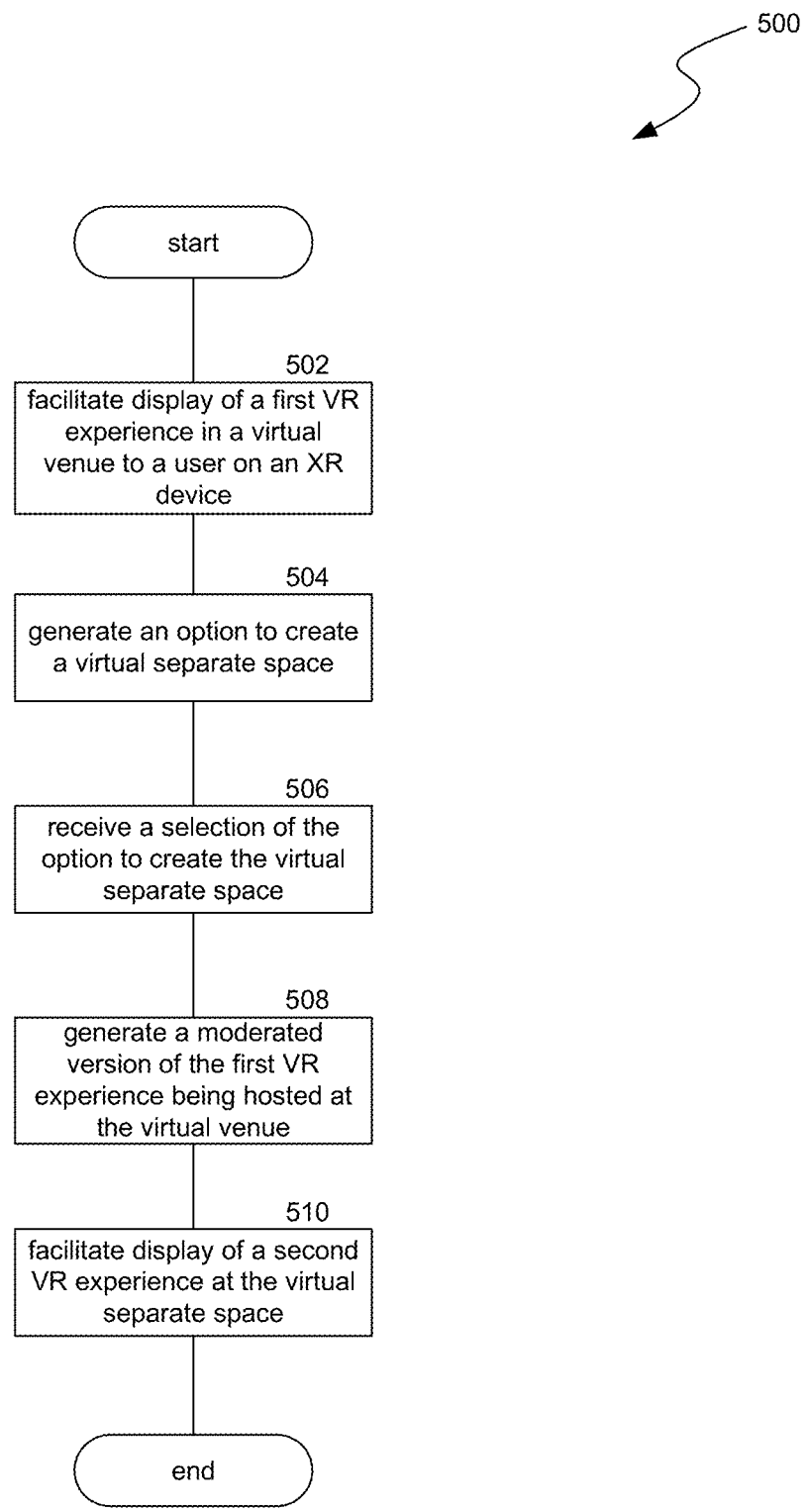
FIG. 5 is a flow diagram illustrating a process used in some implementations of the present technology for providing a virtual separate space with respect to a virtual venue hosting a virtual reality experience.

FIG. 5 is a flow diagram illustrating a process 500 used in some implementations for providing a virtual separate space with respect to a virtual venue hosting a virtual reality (VR) experience. In some implementations, process 500 can be performed as a response to a user request to join a VR experience. In some implementations, process 500 can be performed by a server. In some implementations, process 500 can be performed by virtual separate space system 164 of FIG. 1. In some implementations, process 500 can be performed by an XR device. The XR device can include, for example, a head-mounted display (HMD), such as HMD 200 of FIG. 2A or HMD 252 of FIG. 2B, and/or a processing device in communication with an HMD, and/or a two-dimensional (2D) interface, e.g., a computer, television, mobile device, etc., capable of rendering VR experiences.

At block 502, process 500 can facilitate display of a first VR experience in a virtual venue to a user on an artificial reality (XR) device. The XR device can be an XR interface or a 2D interface, as described further herein. The virtual venue can include an avatar of the user of the XR device, indicating that the user is viewing the first VR experience. In some implementations, process 500 can facilitate display of the first VR experience by applying and/or controlling lighting effects applied to the XR device to render the first VR experience. In some implementations, process 500 can facilitate display of the first VR experience by generating, transmitting, and/or interpreting rendering data used to create the first VR experience.

As one example, at block 502, process 500 can facilitate display of a VR hockey game in a virtual arena to a user of a VR headset. As seen by other users viewing the VR hockey game, the virtual arena can include an avatar of the user viewing the VR hockey game from the virtual arena. The avatar's presence in the virtual arena can indicate that the user is viewing the VR hockey game from the virtual arena.

At block 504, process 500 can generate an option to create a virtual separate space. In some implementations, process 500 can generate and display the option to create the virtual separate space throughout the time in which the first VR experience is displayed. In some implementations, process 500 can generate and display the option to create the virtual separate space at a particular point in time in which the first VR experience is displayed and can, for example, prompt or suggest to a user to create the virtual separate space. Process 500 can suggest that a user create a virtual separate space based on any of a number of factors, such as a time of day (e.g., a virtual sporting event running late into the evening, habits of a particular user at a particular time, etc.), an event occurring within the first VR experience at that particular time (e.g., a loud song at a concert, a large amount of chatter between users at that particular time, etc.), an event occurring outside of the first VR experience at that particular time (e.g., a second VR experience starting), etc.

The virtual separate space can have access rights separate from the virtual venue. For example, in some implementations, the virtual venue can allow any user (or any user paying a particular fee) to join the first VR experience being hosted there, while process 500 can limit access to the virtual separate space. For example, process 500 can limit access to the virtual separate space to those invited by the user creating the space, to those virtually surrounding the user's avatar in the virtual venue, to those requesting to enter the virtual separate space, to a certain number of users, to a certain type of user (e.g., a user having a certain location and/or other demographics), etc. In some implementations, the virtual separate space can be outside of the virtual venue, e.g., a virtual nail salon showing the first VR experience on a virtual television. In some implementations, the virtual separate space can be inside the virtual venue, e.g., a virtual breakroom inside a virtual office.

At block 506, process 500 can receive a selection of the option to create the virtual separate space. For example, a user can select to create the virtual separate space from a menu being displayed in conjunction with the first VR experience, or opened within the first VR experience. In another example, a user can accept to create the virtual separate space from a prompt suggesting that the user creates the virtual separate space.

In conjunction with or after receiving the selection of the option to create the virtual separate space, process 500 can further receive customization data specifying details of the desired virtual separate space. The customization data can include, for example, a type of virtual separate space (e.g., a virtual living room, a virtual restaurant, a virtual vehicle, a virtual park, etc.), who can join the virtual separate space (e.g., how many users, what types of users, friends, etc.), virtual objects to include in the virtual separate space (e.g., virtual popcorn, a virtual television, virtual couches, virtual tables, virtual decorative items, etc.), and the like.

At block 508, process 500 can generate a moderated version of the first VR experience being hosted at the virtual venue. The moderated version of the first VR experience can be different than the VR experience as seen at the virtual venue in any of a number of aspects. For example, the moderated version of the first VR experience can have lower volume, be smaller in size, shown through a window or door of the virtual separate space, shown on a virtual television of the virtual separate space, shown darker in color, shown partially transparent, etc. In some implementations, the user can view an unmodified version the of the VR experience from their separate space. For example, the separate space can be a carved out area of the virtual venue but the users in the separate space can still view the first VR experience in unmodified form.

In some implementations, process 500 can further generate an altered representation of the avatar of the user of the XR device. The altered representation of the avatar of the user can be different than the avatar originally included at the virtual venue in any of a number of aspects. For example, the altered representation of the avatar can be an avatar with headphones on, a faded avatar, a slightly transparent avatar, an avatar surrounded by a virtual bubble, etc. In some cases, the avatars of users in the separate space are unmodified.

At block 510, process 500 can facilitate display of a second VR experience at the virtual separate space. The second VR experience can be any VR experience different than the first VR experience, regardless of whether the second VR experience is collocated with or outside of the virtual venue. In some implementations, the virtual separate space can include the moderated version of the first VR experience and the avatar of the user of the XR device. For example, the second VR experience can be a virtual barber shop where the avatar of the user is getting his hair cut (i.e., a second VR experience) while watching a sporting event on a virtual television at the virtual barber shop (i.e., a moderated version of the first VR experience). In some implementations, it is contemplated that the user can customize his or her avatar for the virtual separate space. In the above example, the user can customize his avatar by donning a hairdresser's robe. In another example, a user can customize her avatar for a virtual living room with pajamas. In some implementations, it is contemplated that the process 500 can display the altered representation of the avatar in the virtual venue without such customizations.

In some implementations, in response to the selection of the option to create the virtual separate space, the virtual venue can include the altered representation of the avatar of the user of the XR device instead of the avatar of the user of the XR device. The altered representation of the avatar of the user can indicate to other users at the virtual venue that the avatar of the user is in the virtual separate space, and that the user is viewing the first VR experience from the virtual separate space. For example, the altered representation of the avatar can be an avatar with headphones on, a faded avatar, a slightly transparent avatar, an avatar surrounded by a virtual bubble, etc.

It is contemplated that avatars of other users in the first VR experience can enter the second VR experience in the virtual separate space in any of a number of manners. In some implementations, avatars of other users in the first VR experience can interact with the altered representation of the avatar of the user to enter the second VR experience in the virtual separate space. For example, the altered representation of the avatar of the user can be a virtual bubble surrounding the avatar of the user. In this example, avatars of other users can join the avatar of the user in the virtual separate space by entering the virtual bubble. In another example, avatars of other users can virtually touch the altered representation of the avatar of the user to join the virtual separate space. In some implementations, process 500 can generate invitations for other users to join the virtual separate space, such as for friends of the user(s) already in the virtual separate space, for users having similar demographics, for users surrounding the altered representation of the avatar of the user in the virtual venue, etc. In some implementations, other users can request to access the virtual separate space, which can be accepted or denied by the user that created the virtual separate space. As avatars of other users join the virtual separate space, process 500 can display the avatars of the other users within the virtual separate space.

Figure 6A:
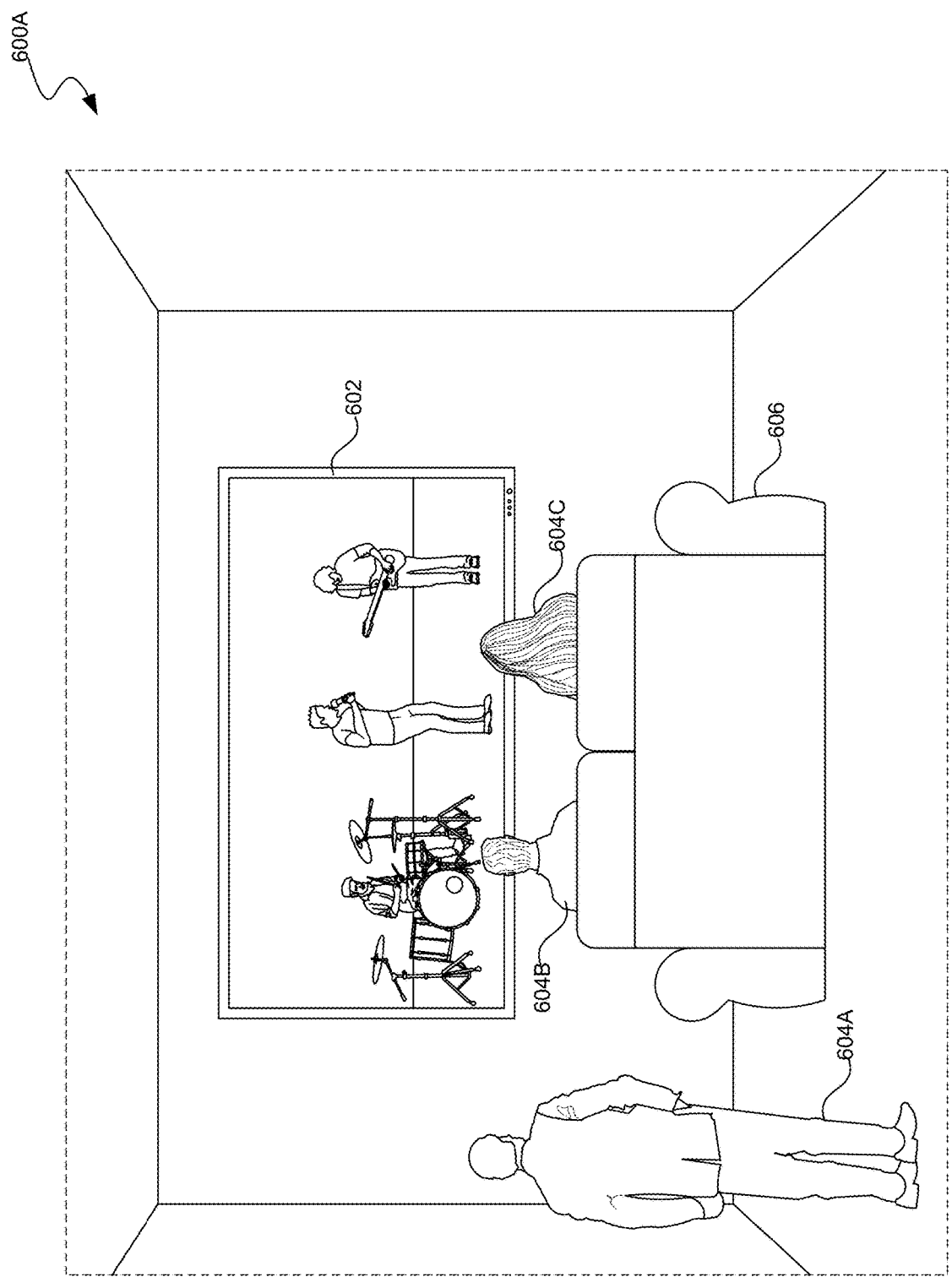
FIG. 6A is a conceptual diagram illustrating an example virtual separate space in which users can view a moderated version of a virtual reality experience separate from a virtual venue hosting the virtual reality experience.

FIG. 6A is a conceptual diagram illustrating an example virtual separate space 600A in which users can view a moderated version 602 of a VR experience separate from a virtual venue hosting the VR experience. Virtual separate space 600A can be a virtual living room in which an avatar 604A of a first user, an avatar 604B of a second user, an avatar 604C of a third user, and an avatar of a fourth user (not shown) are present. In FIG. 6A, virtual separate space 600A is seen from the viewpoint of the fourth user (not shown) using an XR device to view virtual separate space 600A. Virtual separate space 600A includes moderated version 602 of a VR experience. In this example, the VR experience can be a virtual concert. Moderated version 602 can show the virtual concert on a virtual television in virtual separate space 600A.

In some implementations, virtual separate space 600A can be created through selection of an option when viewing the virtual concert at the virtual venue, such as from a virtual menu or a prompt. In some implementations, avatars 604A-604C can be customized for virtual separate space 600A, such as by wearing particular virtual outfits, having particular virtual hairstyles, etc. In some implementations, virtual separate space 600A can be customized to specify the type of virtual separate space 600A (e.g., a living room), virtual objects within virtual separate space 600A (e.g., virtual couch 606), etc. In some implementations, virtual separate space 600A can give users associated with avatars 604A-604C a more private, controllable, quieter, and/or customizable space in which to enjoy the virtual concert.

Figure 6B:
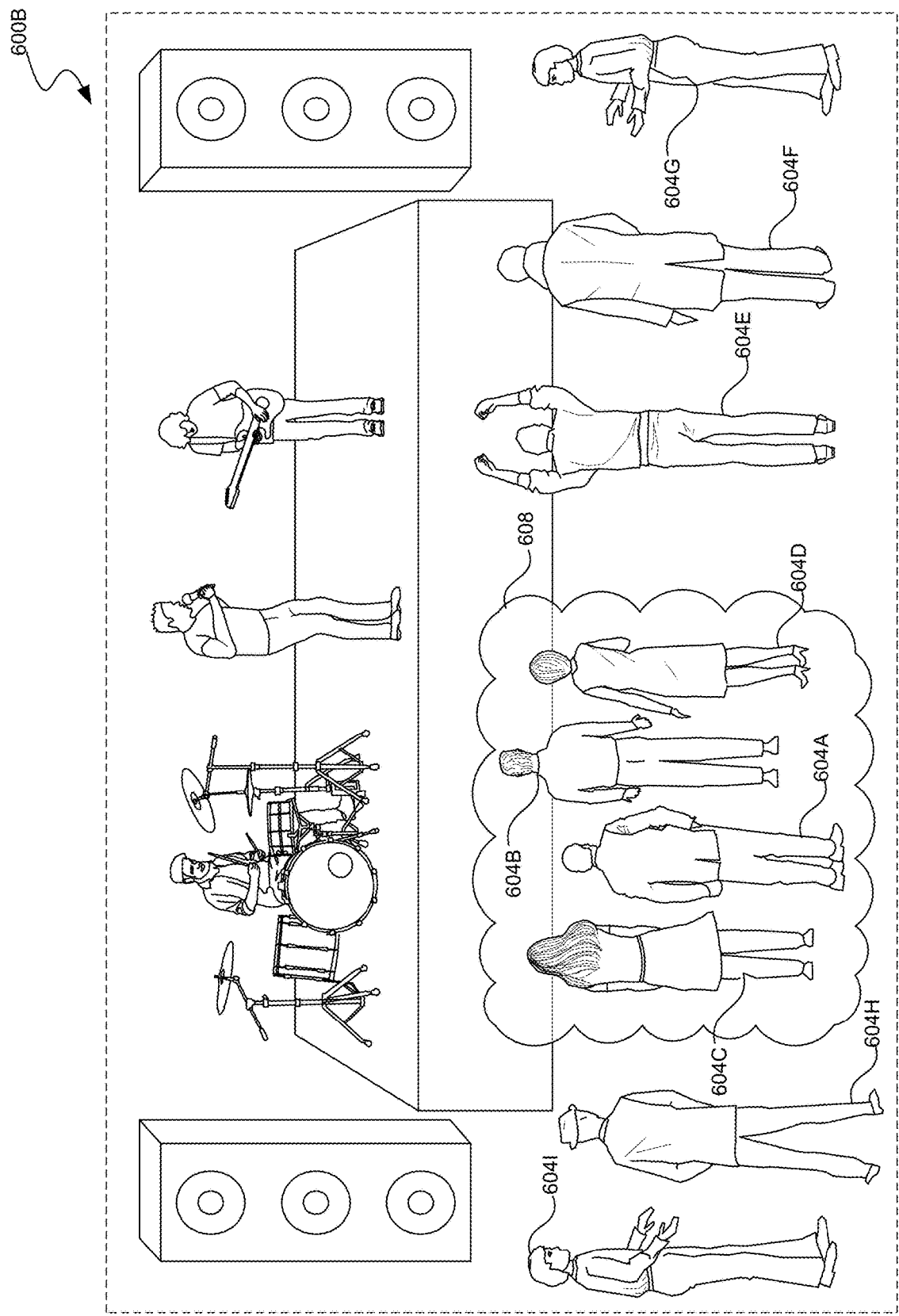
FIG. 6B is a conceptual diagram illustrating an example virtual reality experience at a virtual venue having an altered representation of avatars of users viewing the virtual reality experience from a virtual separate space.

FIG. 6B is a conceptual diagram illustrating an example VR experience 600B at a virtual venue having an altered representation 608 of avatars 604A-604D of users viewing the VR experience 600B from virtual separate space 600A of FIG. 6A. In FIG. 6B, VR experience 600B is from a viewpoint of an avatar of a fifth user (not shown) that is not in virtual separate space 600A. Even though avatars 604A-604D are in virtual separate space 600A, their respective avatars can still be shown in VR experience 600B to other users in VR experience 600B. However, avatars 604A-604D can be shown with an altered representation 608 (e.g., within a bubble) to indicate that they are viewing VR experience 600B from virtual separate space 600A. In some implementations, conversations and/or interactions of avatars 604A-604D within virtual separate space 600A cannot be observed by avatars of other users within VR experience 600B (e.g., avatars 604E-604I). In some implementations, avatars of other users within VR experience 600B (e.g., avatars 604E-604I) can interact with altered representation 608 (e.g., by entering the bubble) and/or avatars 604A-604D (e.g., by touching one or more of avatars 604A-604D) to join virtual separate space 600A.

Figure 7:
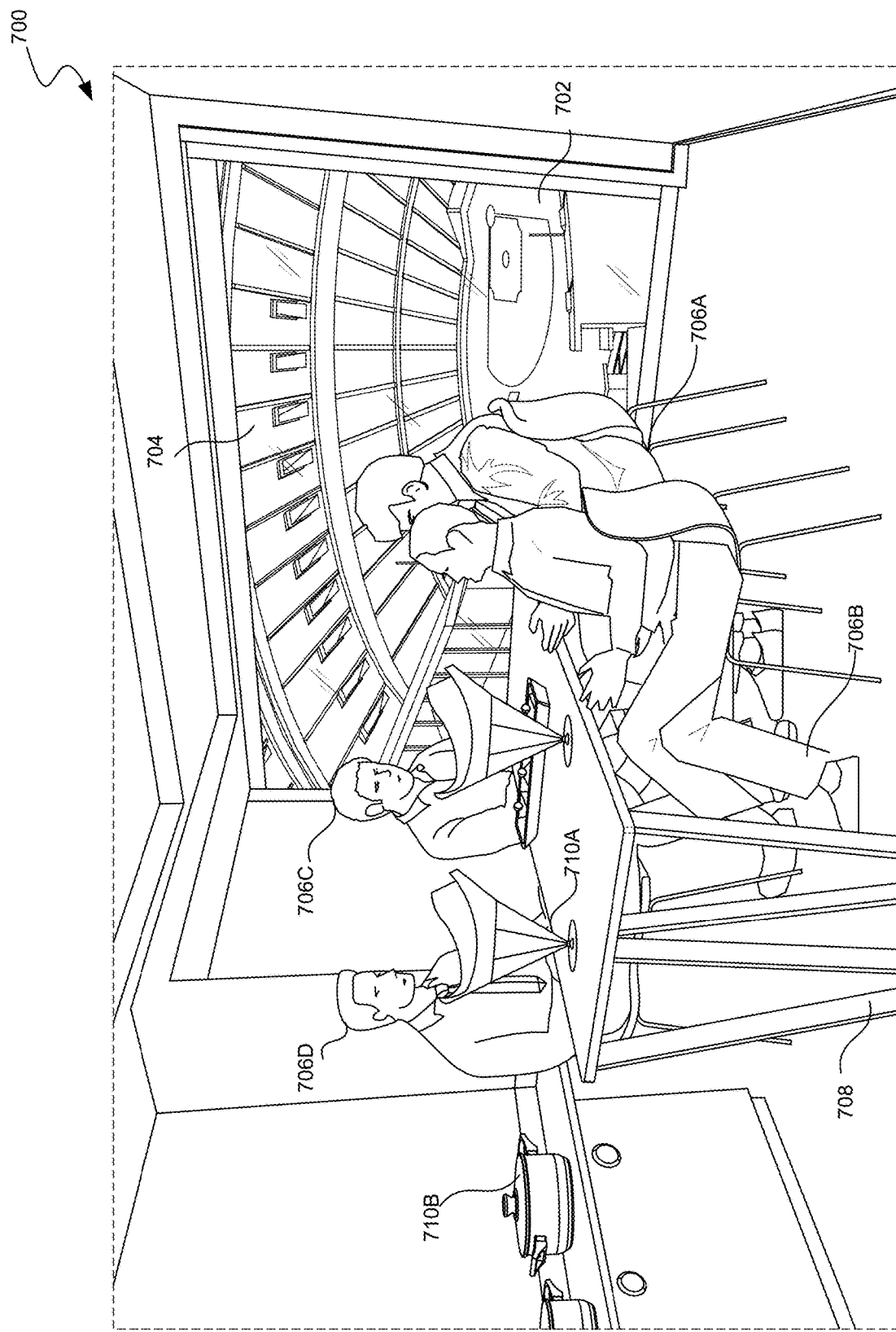
FIG. 7 is a conceptual diagram illustrating an example virtual separate space in which users can view a moderated version of a virtual reality experience from within a virtual venue hosting the virtual reality experience.

FIG. 7 is a conceptual diagram illustrating an example virtual separate space 700 in which users can view a moderated version 702 of a VR experience from within a virtual venue 704 hosting the VR experience. In this example, virtual separate space 700 can be a virtual suite within virtual venue 704 (e.g., a baseball stadium) hosting a VR experience of a virtual baseball game. The virtual baseball game can be displayed as moderated version 702; in this case, shown through the door of virtual separate space 700. Virtual separate space 700 can include avatars 706A-706D associated with users who have joined virtual separate space 700. Virtual separate space 700 can further include virtual objects selected by a user creating and/or customizing virtual separate space 700. For example, virtual separate space 700 can include virtual table 708 and food items 710A-710B, with which avatars 706A-706D can interact. In some implementations, virtual separate space 700 can give users associated with avatars 706A-706D a more private, controllable, quieter, and/or customizable space in which to enjoy the virtual baseball game.

Reference in this specification to "implementations" (e.g., "some implementations," "various implementations," "one implementation," "an implementation," etc.) means that a particular feature, structure, or characteristic described in connection with the implementation is included in at least one implementation of the disclosure. The appearances of these phrases in various places in the specification are not necessarily all referring to the same implementation, nor are separate or alternative implementations mutually exclusive of other implementations. Moreover, various features are described which may be exhibited by some implementations and not by others. Similarly, various requirements are described which may be requirements for some implementations but not for other implementations.

As used herein, being above a threshold means that a value for an item under comparison is above a specified other value, that an item under comparison is among a certain specified number of items with the largest value, or that an item under comparison has a value within a specified top percentage value. As used herein, being below a threshold means that a value for an item under comparison is below a specified other value, that an item under comparison is among a certain specified number of items with the smallest value, or that an item under comparison has a value within a specified bottom percentage value. As used herein, being within a threshold means that a value for an item under comparison is between two specified other values, that an item under comparison is among a middle-specified number of items, or that an item under comparison has a value within a middle-specified percentage range. Relative terms, such as high or unimportant, when not otherwise defined, can be understood as assigning a value and determining how that value compares to an established threshold. For example, the phrase "selecting a fast connection" can be understood to mean selecting a connection that has a value assigned corresponding to its connection speed that is above a threshold.

As used herein, the word "or" refers to any possible permutation of a set of items. For example, the phrase "A, B, or C" refers to at least one of A, B, C, or any combination thereof, such as any of: A; B; C; A and B; A and C; B and C; A, B, and C; or multiple of any item such as A and A; B, B, and C; A, A, B, C, and C; etc.

Although the subject matter has been described in language specific to structural features and/or methodological acts, it is to be understood that the subject matter defined in the appended claims is not necessarily limited to the specific features or acts described above. Specific embodiments and implementations have been described herein for purposes of illustration, but various modifications can be made without deviating from the scope of the embodiments and implementations. The specific features and acts described above are disclosed as example forms of implementing the claims that follow. Accordingly, the embodiments and implementations are not limited except as by the appended claims.

Any patents, patent applications, and other references noted above are incorporated herein by reference. Aspects can be modified, if necessary, to employ the systems, functions, and concepts of the various references described above to provide yet further implementations. If statements or subject matter in a document incorporated by reference conflicts with statements or subject matter of this application, then this application shall control.

We claim:

1. A method for providing a virtual separate space with respect to a virtual venue in virtual reality, the method comprising:
    facilitating display of the virtual venue to a user on an artificial reality device, the virtual venue hosting a first virtual reality experience and including an avatar of the user of the artificial reality device;
    generating an option to create the virtual separate space, the virtual separate space having access rights separate from the virtual venue;
    receiving a selection of the option to create the virtual separate space;
    generating a modified version of the virtual venue and an altered representation of the avatar of the user of the artificial reality device; and
    facilitating display the virtual separate space with the modified version of the virtual venue displayed in a background of the virtual separate space, the virtual separate space hosting a second virtual reality experience and including the avatar of the user of the artificial reality device,
    wherein, in response to the selection of the option to create the virtual separate space, the virtual venue replaces the avatar of the user of the artificial reality device with the altered representation of the avatar of the user of the artificial reality device.

2. The method of claim 1, wherein the altered representation of the avatar of the user indicates that the avatar of the user is in the virtual separate space.

3. The method of claim 2, wherein the user is a first user, the artificial reality device is a first artificial reality device, and the avatar is a first avatar, and wherein the method further comprises:
    receiving an indication that a second avatar associated with a second user of a second artificial reality device has interacted with the altered representation of the first avatar of the first user in the virtual venue; and
    in response to the indication that the second avatar interacted with the altered representation of the first avatar, facilitating display of the second avatar of the second user of the second artificial reality device in the virtual separate space.

4. The method of claim 1, wherein the user is a first user, the artificial reality device is a first artificial reality device, and the avatar is a first avatar, and wherein the method further comprises:
    generating an invitation for a second user of a second artificial reality device to join the virtual separate space;
    receiving acceptance of the invitation for the second user to join the virtual separate space; and
    in response to the acceptance of the invitation, facilitating display of a second avatar of the second user of the second artificial reality device in the virtual separate space.

5. The method of claim 1, wherein the user is a first user, the artificial reality device is a first artificial reality device, and the avatar is a first avatar, and wherein the method further comprises:
    receiving a request from a second artificial reality device associated with a second user to enter the virtual separate space; and
    facilitating display of a second avatar associated with the second user of the second artificial reality device in the virtual separate space.

6. The method of claim 1, wherein the avatar of the user is customizable in the virtual separate space to appear different than the avatar of the user in the virtual venue.

7. A non-transitory computer-readable storage medium storing instructions that, when executed by a computing system, cause the computing system to perform a process for providing a virtual separate space with respect to a virtual venue in virtual reality, the process comprising:
    facilitating display of the virtual venue to a user on an artificial reality device, the virtual venue hosting a first virtual reality experience and including an avatar of the user of the artificial reality device;
    generating an option to create the virtual separate space, the virtual separate space having access rights separate from the virtual venue;
    receiving a selection of the option to create the virtual separate space;
    generating a modified version of the virtual venue; and
    facilitating display of the virtual separate space with the moderated version of the virtual venue displayed in a background of the virtual separate space, the virtual separate space hosting a second virtual reality experience and including the avatar of the user of the artificial reality device.

8. The non-transitory computer-readable storage medium of claim 7, wherein the process further comprises:
    generating an altered representation of the avatar of the user of the artificial reality device,
    wherein, in response to the selection of the option to create the virtual separate space, the virtual venue replaces the avatar of the user of the artificial reality device with the altered representation of the avatar of the user of the artificial reality device.

9. The non-transitory_computer-readable storage medium of claim 8, wherein the altered representation of the avatar of the user indicates that the avatar of the user is in the virtual separate space.

10. The non-transitory_computer-readable storage medium of claim 9, wherein the user is a first user, the artificial reality device is a first artificial reality device, and the avatar is a first avatar, and wherein the process further comprises:
  receiving an indication that a second avatar associated with a second user of a second artificial reality device has interacted with the altered representation of the first avatar of the first user in the virtual venue; and
  in response to the indication that the second avatar interacted with the altered representation of the first avatar, facilitating display of the second avatar of the second user of the second artificial reality device in the virtual separate space.

11. The non-transitory computer-readable storage medium of claim 7, wherein the user is a first user, the artificial reality device is a first artificial reality device, and the avatar is a first avatar, and wherein the process further comprises:
  generating an invitation for a second user of a second artificial reality device to join the virtual separate space;
  receiving acceptance of the invitation for the second user to join the virtual separate space; and
  in response to the acceptance of the invitation, facilitating display of a second avatar of the second user of the second artificial reality device in the virtual separate space.

12. The non-transitory computer-readable storage medium of claim 7, wherein the user is a first user, the artificial reality device is a first artificial reality device, and the avatar is a first avatar, and wherein the process further comprises:
  receiving a request from a second artificial reality device associated with a second user to enter the virtual separate space; and
  facilitating display of a second avatar associated with the second user of the second artificial reality device in the virtual separate space.

13. The non-transitory computer-readable storage medium of claim 7, wherein the avatar of the user is customizable in the virtual separate space to appear different than the avatar of the user in the virtual venue.

14. A computing system for providing a virtual separate space with respect to a virtual venue hosting a first virtual reality experience, the computing system comprising:
  one or more processors; and
  one or more memories storing instructions that, when executed by the one or more processors, cause the computing system to perform a process comprising:
    facilitating display of the virtual venue to a user on an artificial reality device, the virtual venue hosting a first virtual reality experience and including an avatar of the user of the artificial reality device;
    receiving a command to create the virtual separate space, the virtual separate space having access rights separate from the virtual venue;
    generating a modified version of the first virtual reality the virtual venue; and
    facilitating display of the virtual separate space with the modified version of the virtual venue in a background of the virtual separate space, the virtual separate space hosting a second virtual reality experience and including the avatar of the user of the artificial reality device.

15. The computing system of claim 14, wherein the process further comprises:
  generating an altered representation of the avatar of the user of the artificial reality device,
  wherein, in response to the selection of the command to create the virtual separate space, the virtual venue replaces the avatar of the user of the artificial reality device with the altered representation of the avatar of the user of the artificial reality device.

16. The computing system of claim 15, wherein the altered representation of the avatar of the user indicates that the avatar of the user is in the virtual separate space.

17. The computing system of claim 16, wherein the user is a first user, the artificial reality device is a first artificial reality device, and the avatar is a first avatar, and wherein the process further comprises:
  receiving an indication that a second avatar associated with a second user of a second artificial reality device has interacted with the altered representation of the first avatar of the first user in the virtual venue; and
  in response to the indication that the second avatar interacted with the altered representation of the first avatar, facilitating display of the second avatar of the second user of the second artificial reality device in the virtual separate space.

18. The computing system of claim 14, wherein the user is a first user, the artificial reality device is a first artificial reality device, and the avatar is a first avatar, and wherein the process further comprises:
  generating an invitation for a second user of a second artificial reality device to join the virtual separate space;
  receiving acceptance of the invitation for the second user to join the virtual separate space; and
  in response to the acceptance of the invitation, facilitating display of a second avatar of the second user of the second artificial reality device in the virtual separate space.

19. The computing system of claim 14, wherein the user is a first user, the artificial reality device is a first artificial reality device, and the avatar is a first avatar, and wherein the process further comprises:
  receiving a request from a second artificial reality device associated with a second user to enter the virtual separate space; and
  facilitating display of a second avatar associated with the second user of the second artificial reality device in the virtual separate space.

20. The computing system of claim 14, wherein the avatar of the user is customizable in the virtual separate space to appear different than the avatar of the user in the virtual venue.

* * * * *